United States Patent [19]
Lehman et al.

[11] Patent Number: 5,492,362
[45] Date of Patent: Feb. 20, 1996

[54] AIRBAG WITH CONTROLLED VENTING

[75] Inventors: Scott Lehman, Lakeland, Fla.; Jay D. Blackson, Wyandotte, Mich.; Billie L. Arnold; Said Nakhla, both of Lakeland, Fla.

[73] Assignee: Breed Automotive Technology, Inc., Lakeland, Fla.

[21] Appl. No.: 209,999

[22] Filed: Mar. 11, 1994

[51] Int. Cl.$^6$ .................................................. B60R 21/30
[52] U.S. Cl. ........................................ 280/739; 280/743.1
[58] Field of Search ............................... 280/739, 743 R, 280/743 A, 743.1, 743.2

[56] References Cited

U.S. PATENT DOCUMENTS

| | | | |
|---|---|---|---|
| 5,071,161 | 12/1991 | Mahon et al. | 280/739 |
| 5,114,180 | 5/1992 | Kami et al. | 280/739 |
| 5,186,489 | 2/1993 | Imai | 280/743 A |
| 5,193,847 | 3/1993 | Nakayama | 280/739 |
| 5,280,952 | 1/1994 | Hirabayashi et al. | 280/739 |

*Primary Examiner*—Kenneth R. Rice
*Attorney, Agent, or Firm*—Kane, Dalsimer, Sullivan, Kurucz, Levy, Eisele and Richard

[57] ABSTRACT

An airbag is formed of two or more panels with one or more panel being impervious and the second being pervious to gases. A layer is attached to the gas permeable panel and has a dimension selected to insure that the airbag has a preselected maximum peak pressure during deployment.

11 Claims, 5 Drawing Sheets

AIRBAG WITH CONTROLLED VENTING

BACKGROUND OF THE INVENTION

A. Field of Invention

This invention pertains to an improved airbag for occupants of a motor vehicle.

B. Description of the Prior Art

Airbags are used as a security means for protecting occupants of a motor vehicle in a crash. Airbags should be vented during deployment, allowing the gasses to escape out of the bag at a controlled rate. This venting will control the occupant deceleration during a vehicle crash. Traditionally airbags have been vented by using one or more holes in the bag. One problem with these holes was that they allow particulate matter to escape into the passenger compartment. A second problem is that potential burns can occur if the occupants' skin was exposed to the hot gasses escaping the vent holes. In commonly assigned U.S. Pat. No 5,071,161 a bag is disclosed having a permeable zone made of two layers: a layer made of Gortex® and a reinforcing layer It was found that this bag was difficult and expensive to manufacture.

OBJECTIVES AND SUMMARY OF INVENTION

In view of the above, it is an objective of the present invention to provide an airbag adapted to be vented at a predetermined controlled rate depending on the rate of the gases from a gas generator and the vehicle crash pulse.

A further objective is to provide an airbag which can be made relatively inexpensively.

Other objectives and advantages of the invention shall become apparent from the following description.

Briefly an airbag constructed in accordance with this invention includes two panels. One panel is made of an impervious material, The other panel is made of a single gas pervious material covered partially by a protective and reinforcing layer, The size of the layer is selected to obtain a preselected maximum gas pressure within the bag, The layer may be disposed inside the bag and provided with integral straps to form tethers.

DETAILED DESCRIPTION OF THE INVENTION

Figure 1:
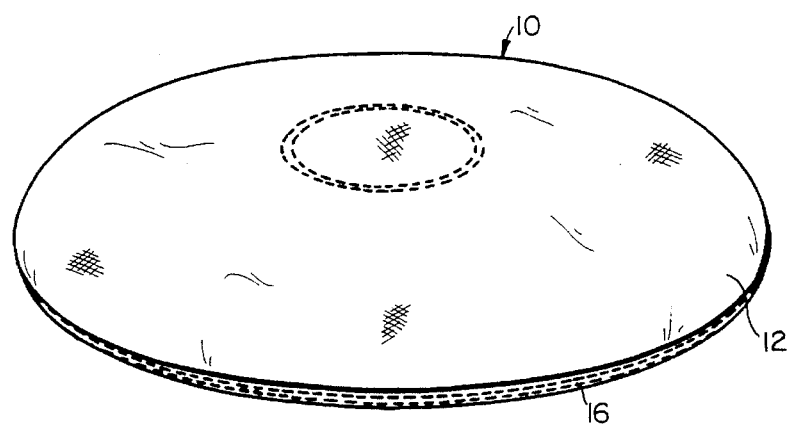
FIG. 1 shows an elevational perspective view of an airbag constructed in accordance with this invention.
Figure 2:
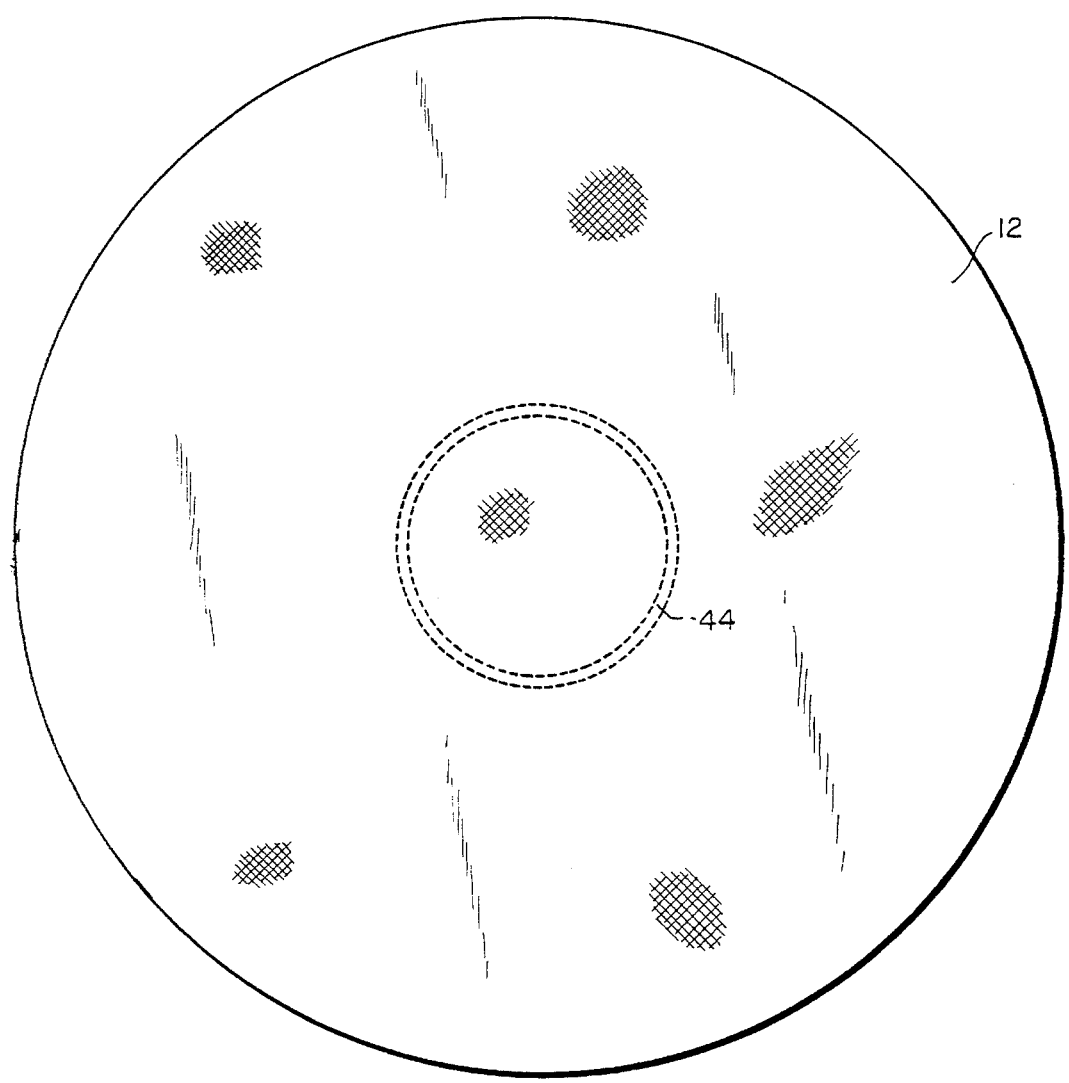
FIG. 2 shows a plan view of the bag of FIG. 1.

FIGS. 1–6 show an airbag 10 constructed in accordance with this invention in its unfolded, deflated state. Generally the airbag 10 has a circular shape and comprises a top panel 12 and a bottom panel 14. It should be understood that directional terms such as top and bottom are used herein purely for the sake of convenience. One skilled in the art would understand that the top panel is the panel which comes in contact with the occupant as the airbag is deployed during a collision.

The two panels 12, 14 are joined together along their outer periphery for example by a sewing 16. Panel 12 is made of a material which is substantially impermeable to gases such as a woven nylon material coated with neoprene. Of course other materials may be used such as for example a polyester fabric coated with neoprene or silicon. Panel 14 is made of a single material sheet which is permeable to gases. Preferably panel 14 is made of a woven fabric having the following characteristics:

Yarn type: 420 denier, high tenacity, nylon 6,6

Yarn count: 49 picks (warp direction) 49 picks (fill direction)

Air permeability: 10–20 cfm at 124 Pa.

One such material is made under the name of Paradiam Plus™ by Milliken & Company of Lagrange, Ga.

Figure 3:
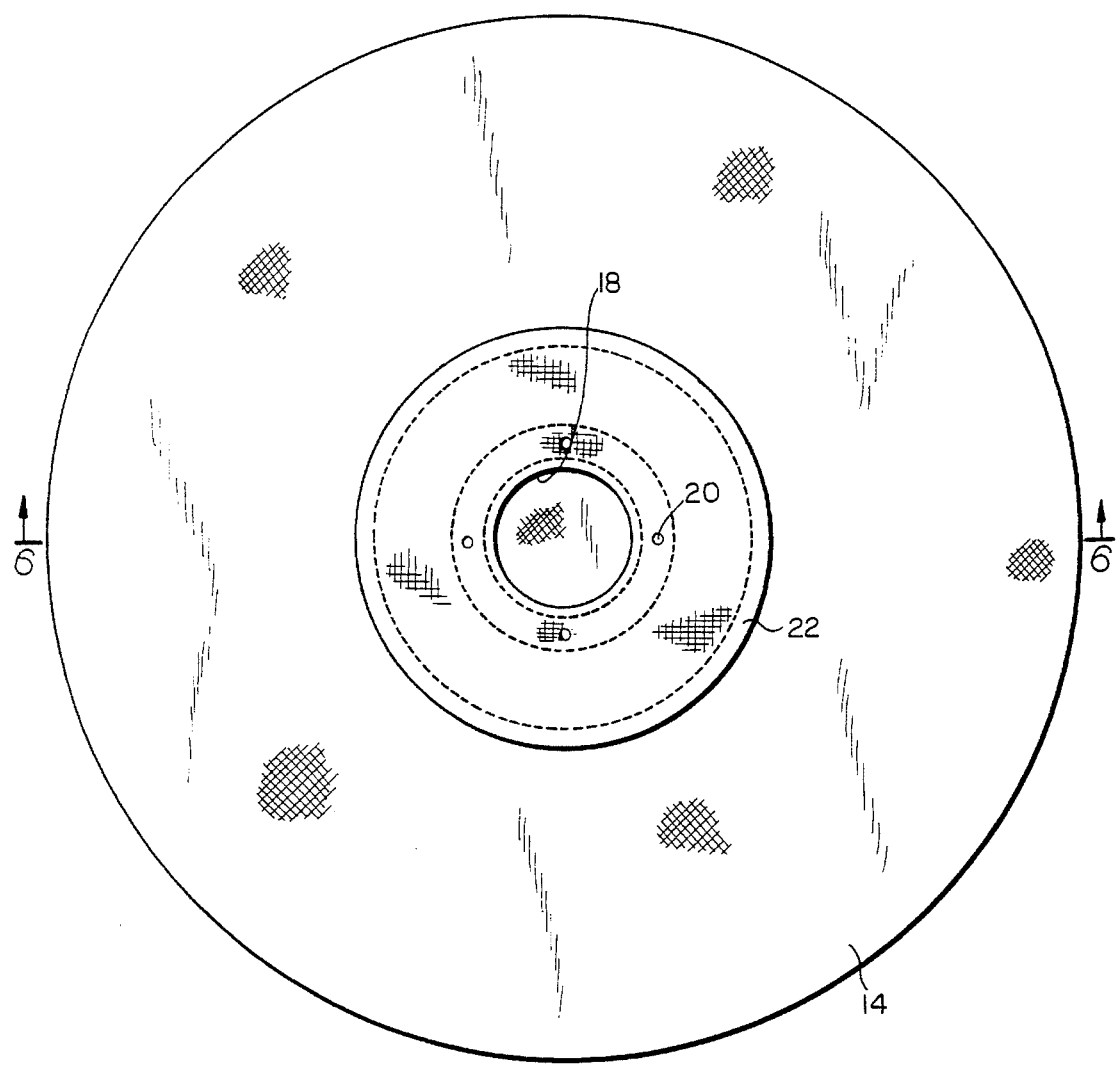
FIG. 3 shows a bottom view thereof.
Figure 4:
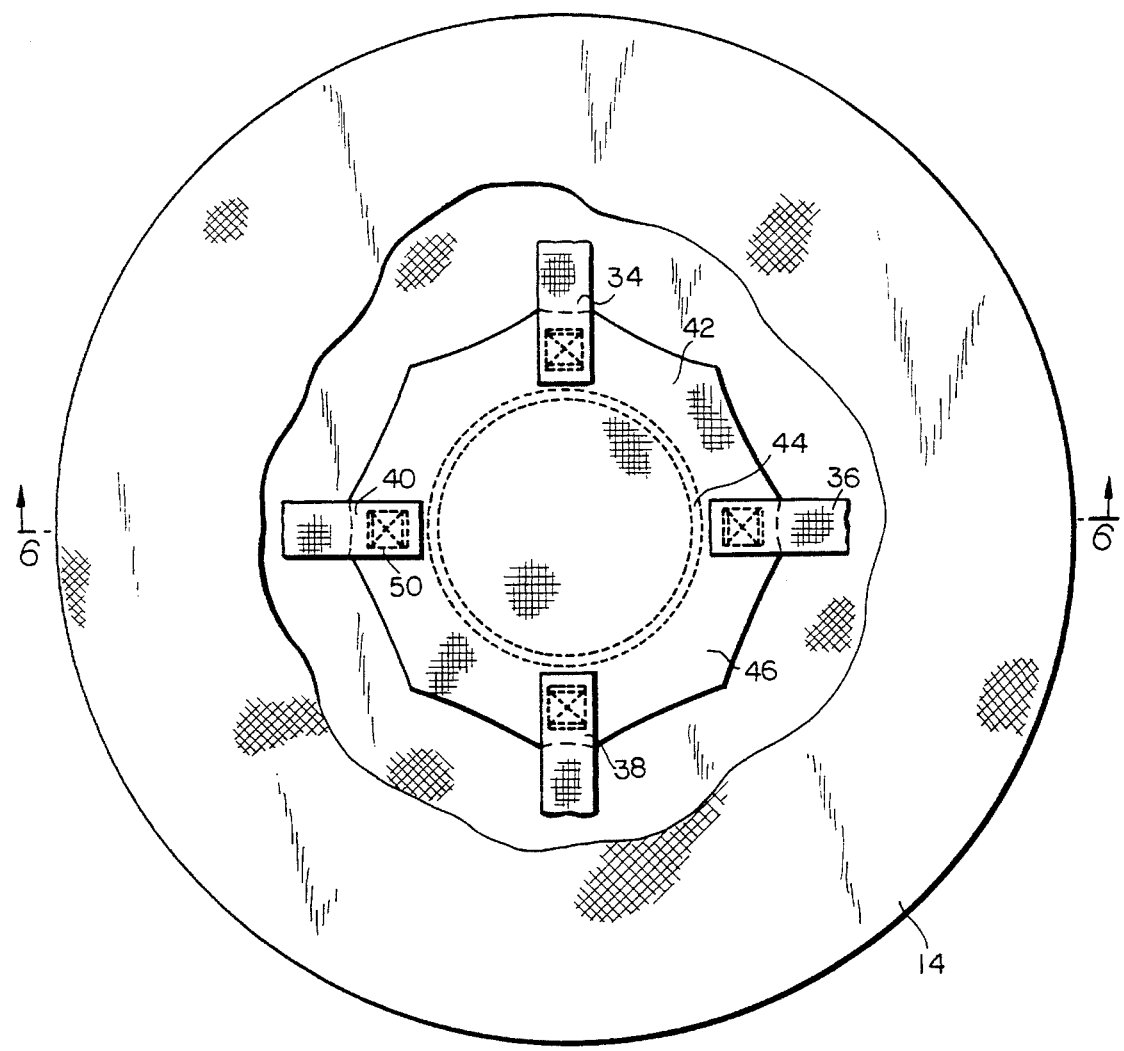
FIG. 4 shows a bottom sectional view with the bottom panel cut away to show the inner portions thereof.
Figure 5:
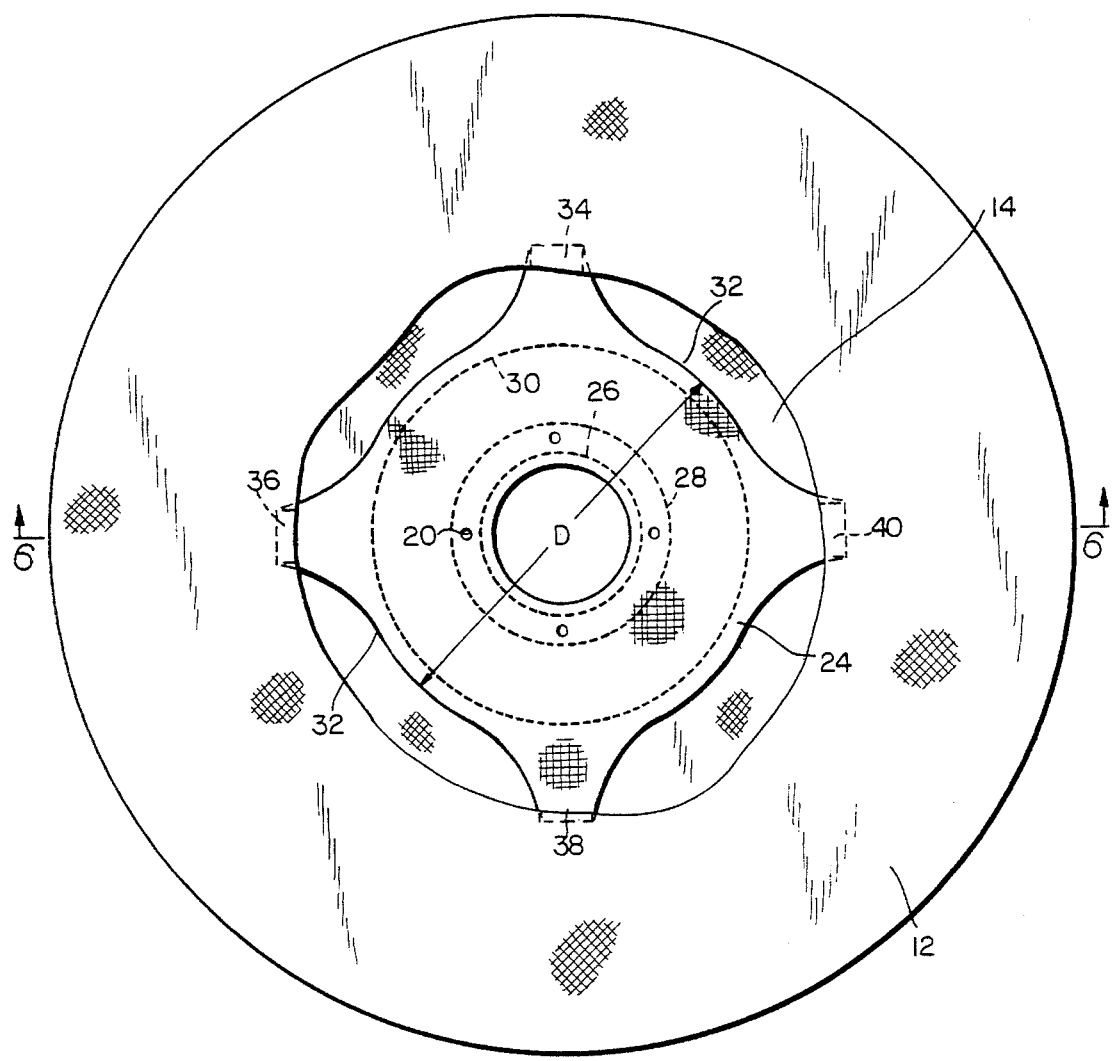
FIG. 5 shows a top sectional view with a portion of the top panel cut away.
Figure 6:
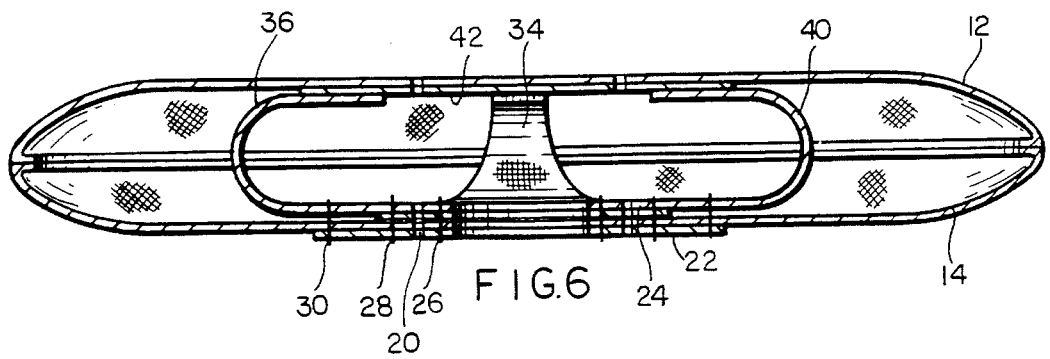
FIG. 6 shows a partial side sectional view of the airbag taken along lines 6—6 in FIG. 5.

As seen in FIG. 3, panel 14 is formed with a substantially circular mouth 18 disposed concentrically or near in the center thereof. A plurality of holes 20 are disposed about the mouth 18 for mounting the airbag 10 to an inflator (not shown). Panel 14 is also provided with two protective layers. One layer 22 is an annular layer disposed on the outside of the airbag 10 while the other layer 24 is disposed on the inside of the airbag 10 as shown in FIG. 4 and 6. Layers 22, 24 are secured to the panel 14 for example by circular sewings 26, 28, 30. Of course the layers could be secured by other means as well. Layer 24 has an outer diameter D shown in FIG. 5 between the circular edge 32. Layer 22 has substantially the same dimensions.

Layers 22 and 24 are made of the same material as the panel 12 and they cooperate to essentially sandwich the panel 14 in between.

During deployment, hot gases from the inflator are introduced into the airbag and inflate it rapidly. Layer 24, and to some extend layer 22, protect the panel 14 from the hot gases and in essence provide a heat shield therefore. In addition layer 22 also provides reinforcement for the panel 14. For example, if sewing was used the threads forming sewings 26, 28, 30 are not in direct contact with the panel 14 but with the much stronger layers 22, 24. As a result, during the deployment of the airbag 10, the panel 14 is held securely to the inflator and will not be ripped off therefrom.

As the airbag 10 inflates, panel 12 normally bulges outwardly toward a dome-shaped configuration. It has been found that it may be desirable to limit the distance by which the airbag throws in a direction parallel to an axis passing through the hole 18. This is accomplished in the present airbag 10 by providing several tethers between the panels 12 and 14. More particularly, as shown in the Figures, layer 24 is formed with four integral straps 34, 36, 38 and 40 extending radially outwardly of the circular edge 32.

In case of tether use, panel 12 is also provided with an inner layer 42. This inner layer 42 is secured to panel 12 by for example sewing 44. Inner layer 42 has an annular zone 46 disposed radially outwardly of sewing 44. This zone 46 is used to secure straps 34–40 to the layer 42 as shown at 50. The length of the straps 34–40 is selected so that the straps limit the maximum distance that panel 12 travels with respect to panel 14 as the airbag 10 is inflated. Thus these straps act as tethers for the airbag 10. Since these straps are made integrally with the layer 24 they will not be ripped away therefrom as the airbag 10 is deployed.

Figure 7:
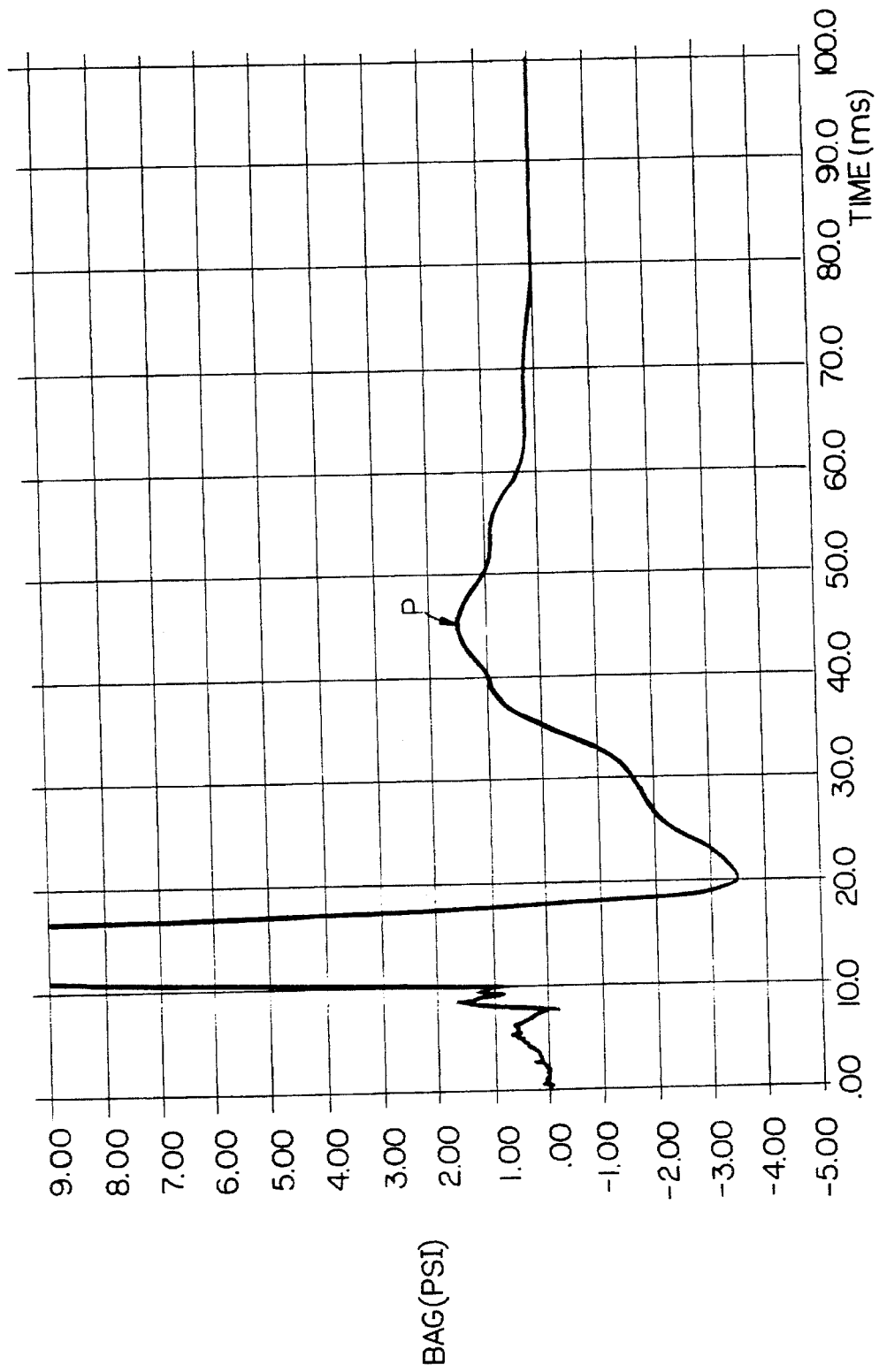
FIG. 7 shows a graph of the pressure of the bag as a function of time.

A typical profile of the pressure inside the airbag 10 is shown in FIG. 7. Initially, after the inflator starts emitting gases, the pressure within the airbag rises very fast. During this time, protective and decorative panels (not shown) are pushed out of the way by the airbag. Next, the air pressure drops to a negative value and then starts rising slowly towards a peak value P at a relatively slow rate. As the airbag is being inflated in this manner, gases from it are vented through the portion of the panel not covered by layers 22, 24. Almost all of the particulate matter in these gases is retained in the airbag by the filtering action of the material of panel 14.

A critical parameter for airbags as they are inflated is the peak pressure P. If this peak pressure P is too high, the bag may be too hard at the moment the motor vehicle occupant hits the airbag. On the other hand if this peak pressure is too low, the bag may be too soft to provide any adequate protection. The value of P is normally in the range of 0.1–10 PSI.

The peak pressure is dependent on the type of inflator used. Different inflator are used for each type of motor vehicle dependent on the total amount of gas to be generated, the rate of gas generation at various instances after a crash is sensed and so on. A given airbag will have a different P value for each type of inflator. However this variation is easily compensated in the present invention by changing the diameter D of the layers 22 and 24. Thus for example if for a given inflator under certain initial conditions, the airbag has a peak pressure P of 1.5–1.75 PSI, essentially the same bag maybe used with a smaller inflator (i.e. an inflator generating less gas, not one having a smaller diameter) but with layers 22, 24 having a larger diameter. For a larger inflator layers having smaller diameter are used. The new diameter is easily determined by measuring the peak pressure P of the airbag having layers 22, 24 of a preselected diameter D, calculating a new diameter which would produce the required peak pressure P based on the measurement, and then making a new airbag having the same sized panels 12, 14 as before but with new sized layers 22, 24 (i.e.larger for smaller inflator and smaller for larger inflator). In this manner the same panels 12, 14 can be made for different types of cars and only the size of the layers 22,24 need be customized for each type.

Obviously numerous modifications may be made to this invention without departing from its scope as defined in the appended claims. For example, while a bag having a circular configuration is shown in the Figures, air bags having other configurations such as rectangular or square may be made as well using the same principles outlined above.

We claim:

1. An airbag for a vehicular occupant restraint system comprising:

a circular first panel made of a material impervious to gases;

a circular second panel attached to said first panel to form a bag, said second panel having an opening for receiving an inflator and being made of a single fabric; and a protective layer attached to said second panel and disposed about said opening, said protective layer having a dimension selected to limit the peak pressure within said bag to a preselected range when such bag is inflated for the protection of an occupant;

said second panel being made of a material pervious to gases and said protective layer being made of a material impervious to said gases;

for the same size of said panels, said protective layer being so constructed, dimensioned and arranged to be larger in size for a smaller inflator and smaller in size for a larger inflator in order to produce the required peak pressure within the bag at the moment the occupant hits the inflated bag.

2. The airbag of claim wherein said preselected peak pressure is in the range of 0.1–10 PSI.

3. The airbag of claim 1 further comprising a second layer, said second layer cooperating with said first layer to sandwich an portion of said second panel therebetween.

4. The airbag of claim 3 wherein said second layer has the same linear dimension as said first layer.

5. The airbag of claim 3 wherein said first layer and said second layer are attached to each other, with said portion being disposed therebetween.

6. The airbag of claim 3 wherein said second layer is disposed inside said bag and is provided with a plurality of integral straps, said straps forming tethers for said airbag.

7. The airbag of claim 6 further comprising a third layer disposed inside said bag and attached to said first panel, said straps being secured to said third layer.

8. A method of making a plurality of airbags comprising the steps of:

forming a first and a second panel, said first panel being made of a gas impervious material, said second panel being made of a gas pervious material and having an access hole for receiving an inflator;

forming a first reinforcing layer and protective second layer of a gas impervious material, said second layer being disposed inside said bag;

attaching said panels and said layers to form a bag, said panels being peripherally attached and said first and second layers being attached to said second panel to render a portion of said second panel gas impervious, said layers having a linear dimension selected to define a preselected peak gas pressure;

for the same size of said panels, said protective layer being so constructed, dimensioned and arranged to be larger in size for a smaller inflator and smaller in size for a larger inflator in order to produce the required peak pressure within the bag at the moment the occupant hits the inflated bag.

9. The method of claim 8 wherein said first layer is substantially circular and said second layer being formed with a plurality of straps extending radially, attaching said straps to said first panel to form tethers.

10. The method of claim, 9 wherein said straps are integrally formed with said second layer.

11. The airbag of claim 8 wherein said second layer is superimposed over said second panel and is made of fire resistant material for protecting said bag from hot gases.

\* \* \* \* \*